United States Patent
Dei et al.

(10) Patent No.: US 6,496,276 B1
(45) Date of Patent: Dec. 17, 2002

(54) PRINTER HAVING AN INFRARED DATA RECEIVER

(75) Inventors: Koji Dei, Kanagawa (JP); Tadashi Yokouchi, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 08/936,764

(22) Filed: Sep. 24, 1997

(30) Foreign Application Priority Data

Sep. 27, 1996 (JP) .............................................. 8-256647

(51) Int. Cl.⁷ ............................................... G06F 15/00
(52) U.S. Cl. ........................................ 358/1.15; 358/1.1
(58) Field of Search ..................... 395/114; 340/870.28, 340/870.29; 342/53; 455/151.2; 358/1.15, 1.13, 1.6, 1.1, 1.14; 709/200, 201, 242

(56) References Cited

U.S. PATENT DOCUMENTS

| | | | | |
|---|---|---|---|---|
| 5,309,351 A | * | 5/1994 | McCain et al. ............. | 364/132 |
| 5,774,637 A | * | 6/1998 | Haber et al. ................ | 395/114 |
| 5,822,508 A | * | 10/1998 | Ohara ........................ | 395/114 |
| 5,864,651 A | * | 1/1999 | Lavie et al. ............... | 358/1.15 |

* cited by examiner

Primary Examiner—Gabriel Garcia
(74) Attorney, Agent, or Firm—Rader, Fishman & Grauer PLLC; Ronald P. Kananen

(57) ABSTRACT

There is provided a printer, in which print data from an external electronic appliance is transmitted to a computer and processed therein, and the processed data is supplied to a printing unit, and then a picture based on that processed print data can be printed by means of the printing unit. This printer includes a parallel I/O terminal (or serial I/O terminal) to which a computer is connected, a built-in infrared ray transmitter/receiver to which the external electronic appliance having an infrared ray transmitter/receiver is connected through the infrared ray transmitter/receiver, a first transmitting path for connecting the parallel I/O terminal (or serial I/O terminal) and the built-in infrared ray transmitter/receiver, and a second transmitting path for connecting the parallel I/O terminal (or serial I/O terminal) and the printing unit.

14 Claims, 2 Drawing Sheets

PRINTER HAVING AN INFRARED DATA RECEIVER

BACKGROUND OF THE INVENTION

1. Field of the Invention

The present invention relates to a printer.

2. Background of the Invention

Hereinafter, a printer (e.g., sublimation type thermal transfer printer) will be described with reference to FIG. 1. Reference numeral 1 denotes a printer and reference numeral 1A denotes a printing unit thereof. The printer 1 includes a parallel I/O terminal 3, a serial I/O terminal 7 and an infrared ray transmitter/receiver (built-in infrared ray transmitter/receiver) 6. The printer 1 includes a data change-over apparatus 2.

The data change-over apparatus 2 contains data transforming devices 4, 5, 8 for performing serial/parallel mutual transformation. The data transforming device 4 is connected to the parallel I/O terminal 3 through a serial transmitting path a and also to the printing unit 1A through a parallel transmitting path 21. The data transforming device 5 is connected to the infrared ray transmitter/receiver 6 through a serial transmitting path b and also to the printing unit 1A through a parallel transmitting path 22.

The data transforming device 8 is connected to the serial I/O terminal 7 through a serial transmitting path c. Further, the data transforming device 8 can be connected to the printing unit 1A through a parallel transmitting path (not shown) when the data transforming device 4 is not connected to the printing unit 1A through the parallel transmitting path 21.

Reference numeral 9 denotes a personal computer, which is connected to the parallel I/O terminal 3 through a parallel transmitting path 20. Reference numeral 10 denotes a personal computer which is different from the personal computer 9 in terms of machine type, which is connected to the serial I/O terminal 7 through a serial transmitting path d.

Reference numeral 12 denotes an electronic still camera (digital camera) which is an example of an external electronic device and has an infrared ray transmitter/receiver 11. Then, an infrared ray transmitting path (space or optical fiber) 17 is formed between the infrared ray transmitter/receiver 11 and the infrared ray transmitter/receiver 6 of the printer 1.

Next, an operation of the printer 1 will be described. Print data from the personal computer 9 is transmitted to the printing unit 1A through the parallel transmitting path 20, the parallel I/O terminal 3, the serial transmitting path a, the data transforming device 4 and the parallel transmitting path 21. Then, the printing unit 1A can print a picture (picture in a narrow sense, or character or both of them) on a print paper (not shown) according to the print data.

The print data from the electronic still camera 12 is transmitted to the printing unit 1A through the infrared ray transmitter/receiver 11, the infrared ray transmitting path 17, the infrared ray transmitter/receiver 6, the serial transmitting path b, the data transforming device 5 and the parallel transmitting path 22. Then, the printing unit 1A can print a picture (picture in a narrow sense) according to the print data on a print paper (not shown).

Meantime, it is possible to transmit the print data from the personal computer 10 by using a parallel transmitting path between the data transforming device 8 and the printing unit 1A, instead of connecting the data transforming device 4 and the printing unit 1A by means of the parallel transmitting path 21, and supply that print data to the printing unit 1A, and print an image (picture in a narrow sense, or character or both of them) on a print paper (not shown) according to the print data.

In the aforementioned printer, the print data from an external electronic appliance such as an electronic still camera or the like is transmitted to the printing unit and the picture based on the print data can be printed on a print paper. However, according to this printer, it is impossible that the print data from the external electronic appliance is transmitted to the computer, processed therein, and then supplied to the printing unit, and the printing unit prints out a picture based on that processed print data on a print paper.

SUMMARY OF THE INVENTION

Accordingly, an object of the present invention is to provide a printer wherein a print data from an external electronic appliance is transmitted to a computer and processed therein and the processed data is supplied to a printing unit and a picture based on the processed print data can be printed by means of the printing unit.

According to the present invention, there is provided a printer which comprises an I/O terminal to which a computer is connected; a built-in infrared ray data receiver, a printing unit, a first transmitting path for supplying a signal output from the built-in infrared ray data receiver to the I/O terminal, and a second transmitting path for supplying the signal supplied from the I/O terminal to the printing unit.

According to the present invention with the above arrangement, the print data from the printer external electronic appliance is transmitted to the computer through the infrared ray transmitter/receiver, the built-in infrared ray transmitter/receiver, the first transmitting path and the parallel I/O terminal (or serial I/O terminal). The print data is processed therein and the processed data is supplied to the printing unit through the parallel I/O terminal (serial I/O terminal) and the second transmitting path. A picture according to the processed print data can be printed by means of the printing unit. In this case, the computer is capable of transmitting a command signal for making the print data from the external electronic appliance transmitted to the computer, to the external electronic appliance through the parallel I/O terminal (or serial I/O terminal), the first transmitting path, the built-in infrared ray transmitter/receiver and the infrared ray transmitter/receiver.

DETAILED DESCRIPTION OF THE PREFERRED EMBODIMENT

Figure 1:
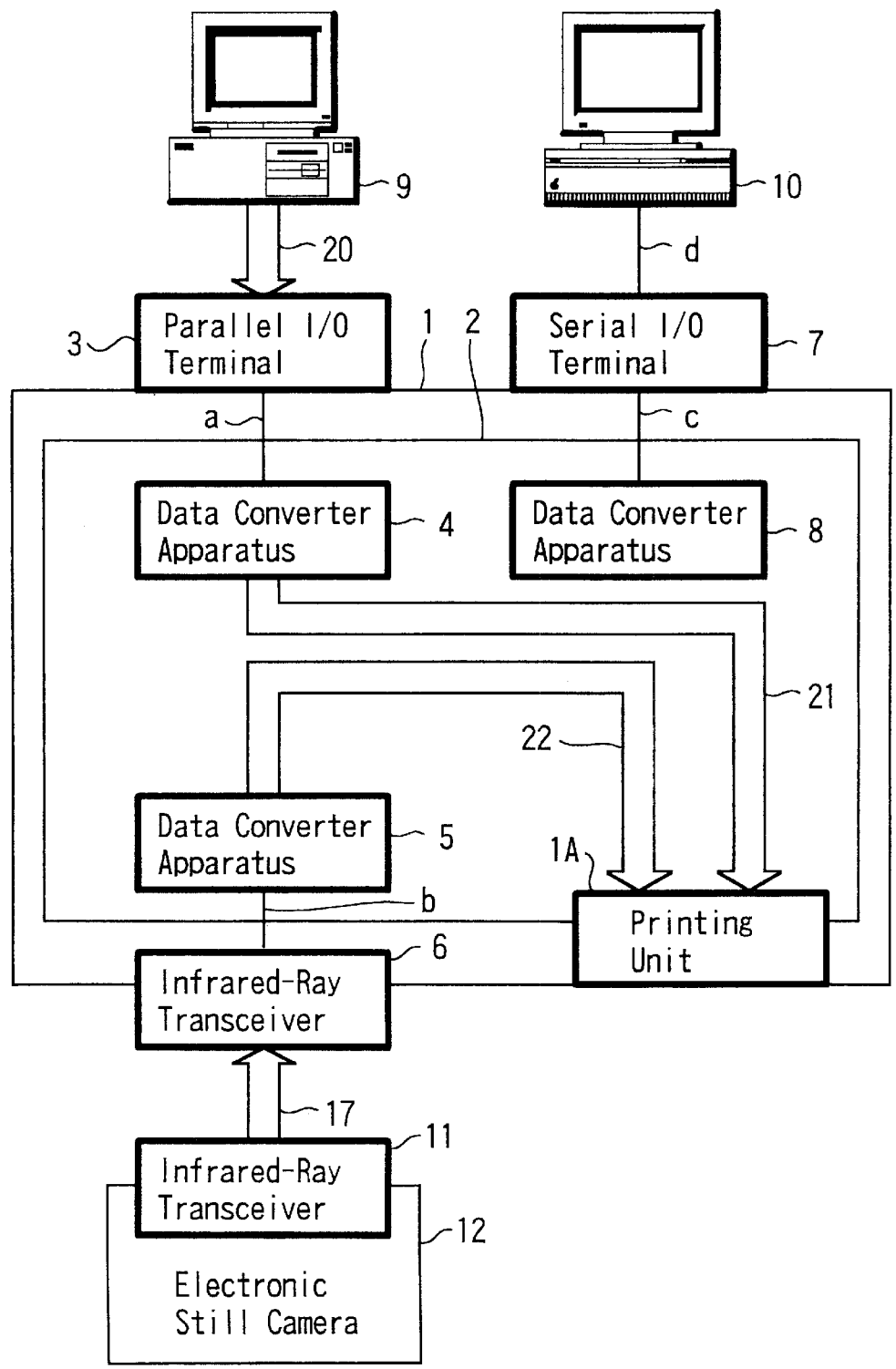
FIG. 1 is a block diagram showing a printer.
Figure 2:
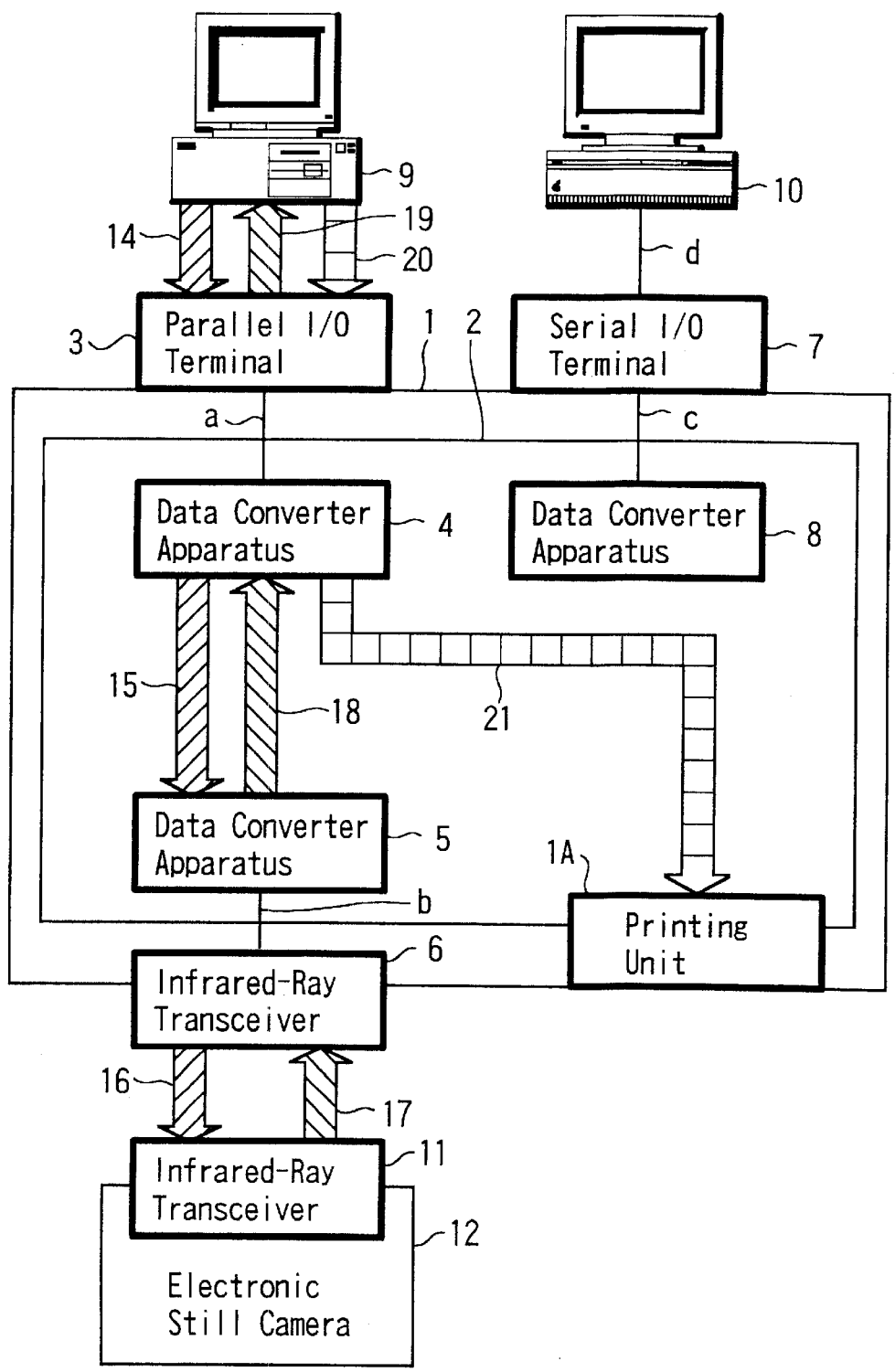
FIG. 2 is a block diagram showing a printer according to an embodiment of the present invention.

Hereinafter, an embodiment of the present invention will be described with reference to FIG. 2. In FIG. 2, the same reference numerals as those of FIG. 1 denote the same parts. Reference numeral 1 denotes a printer (e.g., sublimation type thermal transfer printer, however the printer is not limited to this type). Reference numeral 1A denotes a printing unit. The printer 1 includes a parallel I/O terminal 3, a serial I/O terminal 7 and an infrared ray transmitter/receiver (build-in infrared ray transmitter/receiver) 6. The printer 1 includes a data change-over apparatus 2.

The data change-over apparatus 2 is provided with data transforming devices 4, 5, 8 for performing serial/parallel mutual transformation. The data transforming device 4 is connected to the parallel I/O terminal 3 through a serial transmitting path a and also to the printing unit 1A through a parallel transmitting path 21. Further, the data transforming device 4 is connected to the data transforming device 5 through parallel transmitting paths 15, 18. Although the parallel transmitting paths 15, 18 are a common transmitting path, apparently two transmitting paths are indicated to distinguish a transmission direction of the signal. The data transforming device 5 is connected to the infrared ray transmitter/receiver 6 through a serial transmitting path b.

The data transforming device 8 is connected to the serial I/O terminal 7 through a serial transmitting path c. When the parallel transmitting paths 21, 15, 18 are not connected between the data transforming device 4 and the printing unit 1A, and between the data transforming devices 4 and 5, it is possible to connect the parallel transmitting paths (not shown) between the data transforming device 8 and the printing unit 1A, and between the data transforming devices 8 and 5.

Reference numeral 9 denotes a personal computer, which is connected to the parallel I/O terminal 3 through the parallel transmitting paths 14, 19, 20. Although the parallel transmitting paths 14, 19, 20 are a common transmitting path, apparently three transmitting paths are indicated to distinguish the signal transmitting directions and transmission signals. The data transforming device 5 is connected to the infrared ray transmitter/receiver 6 through the serial transmitting path b.

Reference numeral 10 denotes a personal computer which is different in type from the personal computer 9. The personal computer 10 is connected to the serial I/O terminal 7 through a serial transmitting path A.

Reference numeral 12 denotes an electronic still camera (digital camera) which is an example of an external electronic device appliance and has an infrared ray transmitter/receiver 11. Infrared ray transmitting paths 16, 17 are formed between the infrared ray transmitter/receiver 11 and the infrared ray transmitter/receiver 6 of the printer 1. Although the infrared ray transmitting paths 16, 17 are a common infrared ray transmitting path (air or optical fiber), apparently two transmitting paths are indicated to distinguish the signal transmission directions.

Next, an operation of the printer 1 according to this embodiment will be described. The personal computer 9 generates a command signal for making the electronic still camera 12 transmit print data from the electronic still camera 12 to the personal computer 9. This command signal is transmitted to the electronic still camera 12 through the parallel transmitting path 14, the parallel I/O terminal 3, the serial transmitting path a, the data transforming device 4, the parallel transmitting path 15, the data transforming device 5, the serial transmitting path b, the infrared ray transmitter/receiver 6, the infrared ray transmitting path 16 and the infrared ray transmitter/receiver 11. Meanwhile, the serial transmitting path a, the data transforming device 4, the parallel transmitting path 15, the data transforming device 5 and the serial transmitting path b are assumed to be a first transmitting path.

Then, the print data from the electronic still camera 12 is transmitted to the personal computer 9 through the infrared ray transmitter/receiver 11, the infrared ray transmitting path 17, the infrared ray transmitter/receiver 6, the serial transmitting path b, the data transforming device 5, the parallel transmitting path 18, the data transforming device 4, the serial transmitting path a, the parallel I/O terminal 3 and the parallel transmitting path 19. The serial transmitting path b, the data transforming device 5, the parallel transmitting path 18, the data transforming device 4 and the serial transmitting path a are also assumed to be the first transmitting path.

Then, the personal computer 9 processes the print data from the electronic still camera 12. The processed print data is supplied to the printing unit 1A through the parallel transmitting path 20, the parallel I/O terminal 3, the serial transmitting path a, the data transforming device 4 and the parallel transmitting path 21. According to the processed print data, a print picture (picture in a narrow sense) can be printed on a paper (not shown) by the printing unit 1A. Meanwhile, the serial transmitting path a, the data transforming device 4 and the parallel transmitting path 21 are assumed to be a second transmitting path.

The print data from the electronic still camera 12 can be transmitted to the printing unit 1A without being processed by the personal computer 9. In this case, the print data from the electronic still camera 12 is supplied to the printing unit 1A through the infrared ray transmitter/receiver 11, the infrared ray transmitting path 17, the infrared ray transmitter/receiver 6, the serial transmitting path b, the data transforming device 5, the parallel transmitting path 18, the data transforming device 4 and the parallel transmitting path 21. A picture (picture in a narrow sense) based on that print data can be printed on a print paper (not shown) by means of the printing unit 1A. Meanwhile, the serial transmitting path b, the data transforming device 5, the parallel transmitting path 18, the data transforming device 4 and the parallel transmitting path 21 are assumed to be a third transmitting path.

In a case when, instead of connecting the data transforming devices 4 and 5 through the parallel transmitting paths 15, 18 and connecting the data transforming device 4 and the printing unit 1A through the parallel transmitting path 21, the data transforming devices 8 and 5 are connected through parallel transmitting paths corresponding to the parallel transmitting paths 15, 18 and the data transforming device 8 and the printing unit 1A are connected through a parallel transmitting path corresponding to the parallel transmitting path 21, the personal computer 10 transmits a command signal for transmitting print data to the personal computer 10 to the electronic still camera 12. The print data from the electronic still camera 12 is supplied to the personal computer 10. Then, the print data is processed by the personal computer 10 and the processed print data is transmitted to the printing unit 1A. According to that processed print data, the picture can be printed on a print paper (not shown) by means of the printing unit 1A.

Instead of the electronic still camera 12, a picture signal source such as a VTR, a television receiver and so on, or a character signal source such as a facsimile, a telex, a personal computer transmission terminal, an internet terminal and so on can be provided as an external electronic appliance.

Having described a preferred embodiment of the invention with reference to the accompanying drawings, it is to be understood that the invention is not limited to the precise embodiment and that various changes and modifications could be effected therein by one skilled in the art without departing from the spirit or scope of the invention as defined in the appended claims.

What is claimed is:

1. A printer for printing an image and connectable at an input/output terminal to a computer that can receive transformed print data, process the transformed print data and output processed print data, the printer comprising:

a cordless link that receives print data from an external appliance and transmits the print data along a first transmitting path;

a data transforming device connectable to the first transmitting path that receives the print data and outputs transformed print data along a second transmitting path, said second transmitting path connectable to the input/output terminal; and a printing unit that receives the processed data from the data transforming device by way of a third transmitting path and prints the image;

whereby after the computer receives and processes the transformed print data, the computer outputs the processed data to the input/output terminal and the second transmitting path, said data transforming device receives the processed data from the second transmitting path and outputs the processed data along a third transmitting path, and said printer acting as a conduit for said print data from the external appliance to said computer.

2. The printer of claim 1 wherein said cordless link is a bi-directional infrared communications link.

3. The printer of claim 2 wherein the input/output terminal is connectable to a parallel printer port.

4. The printer of claim 2, wherein the input/output terminal is connectable to a serial printer port.

5. The printer of claim 2, wherein at least one of the first, second and third transmitting paths is bi-directional.

6. A printer for printing an image comprising:

a cordless link that receives print data from an external appliance and transmits the print data along a first transmitting path;

a first data transforming device connectable to the first transmitting path that receives the print data and outputs first transformed print data along a second transmitting path;

a second data transforming device connectable to the second transmitting path that receives the first transformed print data and outputs second transformed print data along a third transmitting path;

an input/output terminal connectable to the third transmitting path and connectable to a computer, whereby the second transformed print data is transmitted to the computer for processing into processed print data, the processed print data from the computer is output to the third transmitting path and to the second data transforming device, said second data transforming device receives the processed print data and outputs transformed processed print data along a fourth transmitting path; and a printing unit connectable to the fourth transmitting path that receives the transformed processed data and prints an image of the transformed processed print data;

said printer acting as a conduit for said print data from the external appliance to said computer.

7. The printer of claim 6, wherein the first transmitting path is a serial transmitting path, the second transmitting path is a parallel transmitting path, the third transmitting path is a serial transmitting path, and the fourth transmitting path is a parallel transmitting path.

8. The printer of claim 6, wherein the input/output terminal is a parallel terminal.

9. The printer of claim 6, wherein the input/output terminal is a serial terminal.

10. The printer of claim 6, wherein said cordless link is a bi-directional infrared communications link.

11. The printer of claim 6, wherein at least one of the first, second, third and fourth transmitting paths is bi-directional.

12. A printer system for printing an image comprising:

a cordless link that receives print data from an external appliance and transmits the print data along a first transmitting path;

a first data transforming device connectable to the first transmitting path that receives the print data and outputs first transformed print data along a second transmitting path;

a second data transforming device connectable to the second transmitting path that receives the first transformed print data and outputs second transformed print data along a third transmitting path;

an input/output terminal connectable to the third transmitting path that receives the second transformed print data;

a computer connectable to the third transmitting path that receives the second transformed print data, processes the transformed print data into processed print data and outputs the processed print data to the third transmitting path to the second data transforming device, said second data transforming device receives the processed print data and outputs transformed processed print data along a fourth transmitting path; and a printing unit connectable to the fourth transmitting path, that receives the transformed processed data and prints an image of the transformed processed print data;

said printer acting as a conduit for said print data from the external appliance to said computer.

13. The printer system of claim 12, wherein the electronic appliance is one of an electronic still camera, a television, a video tape recorder, a facsimile machine, a telex machine, and an internet appliance.

14. A method of printing comprising the steps of:

generating a command signal to transmit print data and sending said command signal to an electronic appliance along a first bi-directional transmitting path, said bi-directional path located in a printer;

transmitting said print data from the electronic appliance along the first bi-directional transmitting path to a computer;

processing the print data at the computer and outputting processed print data;

transmitting said processed print data from the computer along a second transmitting path to a printing unit; and receiving the processed print data at the printing unit and printing an image based on the processed print data.

* * * * *